UNITED STATES PATENT OFFICE.

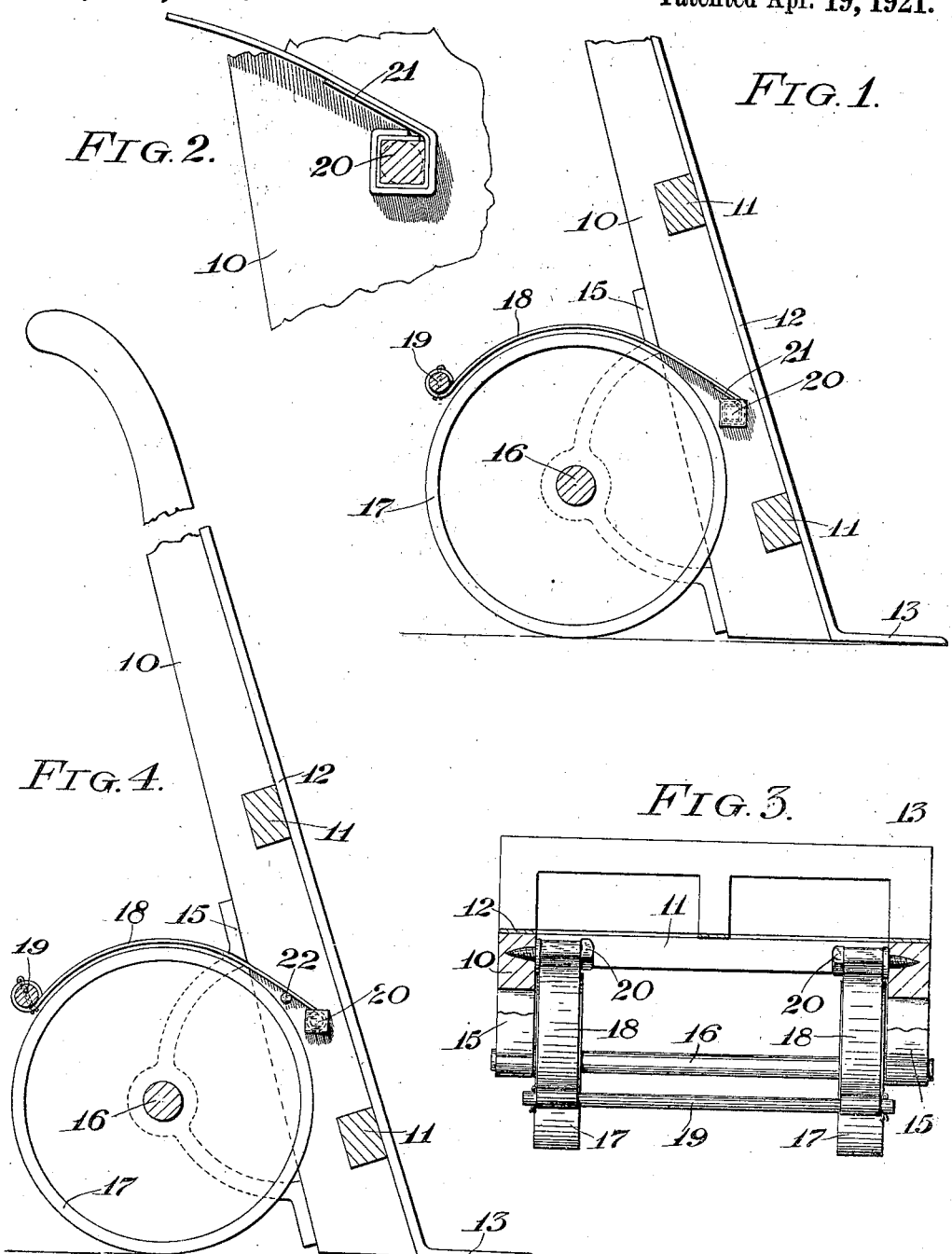

FRED G. HALLADAY, OF APPLETON, WISCONSIN, ASSIGNOR TO SAFETY TRUCK BRAKE CO., OF APPLETON, WISCONSIN, A CORPORATION OF WISCONSIN.

TRUCK-BRAKE.

1,375,150.  Specification of Letters Patent.  Patented Apr. 19, 1921.

Application filed January 2, 1918. Serial No. 210,023.

*To all whom it may concern:*

Be it known that I, FRED G. HALLADAY, a citizen of the United States, and resident of Appleton, Outagamie county, Wisconsin, have invented new and useful Improvements in Truck-Brakes, of which the following is a description, reference being had to the accompanying drawings, which are a part of this specification.

This invention relates to hand trucks commonly used for moving heavy boxes, trunks and the like at shipping points and warehouses, and has for its object to provide a brake which may be operated by the foot for preventing the turning of the rollers when it is desired that the truck should not move, as upon tilting the load onto the truck.

With the above and other objects in view, the invention consists in the truck brake as herein claimed and all equivalents.

Referring to the accompanying drawings, in which like characters of reference indicate the same parts in the different views:

Figure 1 is a side view of a hand truck provided with the truck brake of this invention;

Fig. 2 is a detail thereof;

Fig. 3 is a sectional plan view thereof; and,

Fig. 4 is a view similar to Fig. 1 of a modification of the invention.

In these drawings 10 indicates the side bars of an ordinary hand truck which are connected by cross bars 11 and are provided with a metal facing 12 with the lifting blade 13 at the lower end of the truck. The upper ends of the side bars 10 form handles, while the lower ends have bearing brackets 15 in which is journaled an axle 16 supporting rollers 17, all as usual.

The truck brake of this invention consists of flexible metal straps 18 rigidly secured at one end to the side bars 10 and connected at their other ends by a rod 19. The ends of the flexible metal straps 18 may be rigidly secured to the side bars 10 in any desirable manner. Preferably they are bent around the square shanks of lag screws 20 which are screwed into the side bars 10. If the metal of which the straps 18 are formed is such as to readily bend without possessing resiliency of its own, springs 21 may be bent around the shanks of the lag screws with them and serve to give resiliency to the metal straps to hold them normally slightly away from the treads of the rollers 17. If the metal of which the straps are formed is stiff and unyielding they may have a loose connection around the lag screws 20 and the leaf springs bearing thereagainst may be relied on to hold them away from the rollers.

In Fig. 4 the end of the strap 18, which is of spring metal, is bent around the lag screw 20, and instead of relying on a square shank of the lag screw for springing it away from the tread of the roller, a pin 22 projects from the side bar 10 and is engaged by the under surface of the strap, and is so positioned that it will serve this purpose of holding the strap away from the tread of the roller.

In any case it is the brake strap itself that is bent for the purpose of bringing it into engagement with the roller by pressing on the rod 19 with the foot or in actually standing on it to apply the weight of the operator on one side of the rollers while the load is being lifted or lowered on the other side of the rollers. This dispenses with the necessity for pivotal connections and also for the use of coil springs for withdrawing the brake shoes.

The presence of the brake of this invention does not affect the ordinary use of the hand truck in conveying the heavy load from place to place. But in moving the load onto the truck or in tilting it from the truck to unload it therefrom the tendency of the truck to roll back toward the operator may be overcome by placing the foot on the treadle formed by rod 19 and applying the weight thereto so as to spring the brake shoes 18 into engagement with the rollers 17, thus locking the rollers in a fixed position with relation to the truck and preventing them from traveling over the floor. When the brake is applied the fulcrum about which the brake and its load swing is no longer the axle 16, but the rims of the rollers which bear directly on the floor. As long as the fulcrum is on the axle and the rollers are free to turn, this fulcrum is easily displaced and the weight of the load with its center of gravity far in advance of the fulcrum and the pull on the handle and on the load to lift it or to restrain its fall, have a tendency to cause the truck to back toward the operator. The brake of this invention prevents such movement by locking the rollers against turning and facilitates the handling of the load by lowering the fulcrum to the point of bearing of the rollers on the floor. Furthermore, the brake of this invention is more effective by reason of the yielding flexible character of the brake shoes which enables them to conform to the rims of the rollers and increase the bearing surface between them, and consequently the friction for preventing the turning of the rollers.

What I claim as new and desire to secure by Letters Patent is:

1. In a freight handling truck having side bars and rollers, angular shouldered projections on the side bars of the truck near the rollers, curved spring members with their ends bent around the angular section of said projections and extending over the rims of the rollers and normally spaced therefrom to form brake shoes, said spring members having their other ends bent to form loops, and a cross bar connecting the brake shoes and having its ends confined within the loops of the spring members and adapted to apply the brake shoes to the rims of the rollers by a movement toward the rollers.

2. In a freight handling truck having side bars and rollers, a pair of flat curved spring members attached at one end to the side bars of the truck above the rollers and normally extending over the rims of the rollers and spaced therefrom, said spring members having their ends bent to form loops, a cross bar connecting the spring members by having its ends confined within the loops thereof and adapted to form a treadle on which the operator may stand for moving it toward the rollers to bend the spring members into locking engagement with the rollers and for tilting the truck with its load with the rims of the rollers serving as rocking fulcrums.

3. In a hand truck having side bars and rollers, a pair of flexible and resilient brake shoes secured to the side bars and extending over the rollers and normally spaced therefrom, and a cross bar connecting their outer ends to form a treadle on which the operator may stand for moving it against the rollers and thereby bending the brake shoes into contact with the rims of the rollers from the points of engagement with the rollers near the side bar connections to the ends of the brake shoes.

4. In a hand truck having side bars and rollers, a pair of flexible and resilient brake shoes secured to the side bars near the rims of the rollers and extending over the rollers and normally spaced therefrom, and a cross bar connecting the outer ends of the brake shoes and forming a treadle on which the operator may stand for causing the brake shoes to be wrapped around the rims of the rollers.

5. In a hand truck having side bars and rollers, a pair of flexible resilient brake shoes secured to the side bars and extending over the rollers, and a cross bar connecting the outer ends of the brake shoes and adapted to yield downwardly to cause the brake shoes to bend in contact with the rollers and increase the area of their contact surface with the rollers as the pressure is increased.

In testimony whereof, I affix my signature, in presence of two witnesses.

FRED G. HALLADAY.

Witnesses:
GERTRUDE SCHMITZKEWITZ,
P. A. KORNELY.